United States Patent
Kim et al.

(10) Patent No.: US 11,680,622 B2
(45) Date of Patent: Jun. 20, 2023

(54) FREQUENCY SENSITIVE TYPE SHOCK ABSORBER

(71) Applicant: HL MANDO CORPORATION, Pyeongtaek-si (KR)

(72) Inventors: Kyudo Kim, Seoul (KR); Dongwon Kang, Yongin-si (KR); Namho Kim, Yongin-si (KR); Hyunsoo Park, Seongnam-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 196 days.

(21) Appl. No.: 16/899,951

(22) Filed: Jun. 12, 2020

(65) Prior Publication Data

US 2020/0393015 A1  Dec. 17, 2020

(30) Foreign Application Priority Data

Jun. 12, 2019 (KR) .................. 10-2019-0069359

(51) Int. Cl.
*F16F 9/504* (2006.01)
*F16F 9/19* (2006.01)
(Continued)

(52) U.S. Cl.
CPC .............. *F16F 9/504* (2013.01); *F16F 9/19* (2013.01); *F16F 9/3221* (2013.01); *F16F 9/348* (2013.01);
(Continued)

(58) Field of Classification Search
CPC ........ F16F 9/504; F16F 9/3221; F16F 9/3482; F16F 9/348; F16F 9/19; F16F 9/512;
(Continued)

(56) References Cited

U.S. PATENT DOCUMENTS 5,248,014 A * 9/1993 Ashiba ...................... F16F 9/50
188/282.8
5,690,195 A * 11/1997 Kruckemeyer ......... F16F 9/368
188/282.5
(Continued)

FOREIGN PATENT DOCUMENTS

CN  109707782 A  *  5/2019
DE  102006044557 A1 * 4/2007  .............. F16F 9/512
(Continued)

OTHER PUBLICATIONS

English machined translation of description of DE-102006044557, Apr. 2007.*

*Primary Examiner* — Nicholas J Lane
*Assistant Examiner* — San M Aung
(74) *Attorney, Agent, or Firm* — Morgan, Lewis & Bockius LLP

(57) ABSTRACT

Disclosed is a frequency sensitive type shock absorber including a piston rod reciprocating an inside of a cylinder and having a connection passage therein; a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke; wherein the valve assembly comprises a housing coupled to the piston rod and having a pilot chamber in communication with the connection passage; a main retainer coupled to the piston rod and having a main chamber formed on an upper portion thereof in communication with the connection passage; a first pilot valve coupled to the piston rod and disposed between the housing and the main retainer to partition the pilot chamber and the main chamber; and a second pilot valve coupled to the piston rod and disposed above the pilot chamber and (Continued)

configure to be elastically deformable depending on a change in pressure of the pilot chamber.

20 Claims, 9 Drawing Sheets

(51) Int. Cl.
*F16F 9/348* (2006.01)
*F16F 9/32* (2006.01)
*B60G 13/08* (2006.01)
*B60G 17/08* (2006.01)

(52) U.S. Cl.
CPC .............. *B60G 13/08* (2013.01); *B60G 17/08* (2013.01); *B60G 2202/24* (2013.01); *B60G 2206/41* (2013.01); *B60G 2500/11* (2013.01); *B60G 2800/162* (2013.01); *F16F 2222/12* (2013.01); *F16F 2228/04* (2013.01); *F16F 2228/066* (2013.01)

(58) Field of Classification Search
CPC .. F16F 2222/12; F16F 2228/04; F16F 9/5126; F16F 9/3485; F16F 9/3487; F16F 9/3405; F16F 9/3214; B60G 17/08; B60G 2202/24; B60G 13/08; B60G 2206/41; B60G 2500/11; B60G 280/162
USPC .... 188/275, 280, 269, 282.5, 282.6, 322.13, 188/322.15, 317
See application file for complete search history.

(56) References Cited

U.S. PATENT DOCUMENTS

2005/0056506 A1* 3/2005 Deferme ............... F16F 9/5126
 188/322.15
2015/0210136 A1* 7/2015 Teraoka ................ F16F 9/3487
 188/282.1

FOREIGN PATENT DOCUMENTS

KR 2015065059 A * 6/2015 ............. B60G 17/08
KR 2017087761 A * 7/2017 ................ F16F 9/34
WO WO-2018168865 A1 * 9/2018 ................ F16F 9/18

* cited by examiner

[FIG. 1]
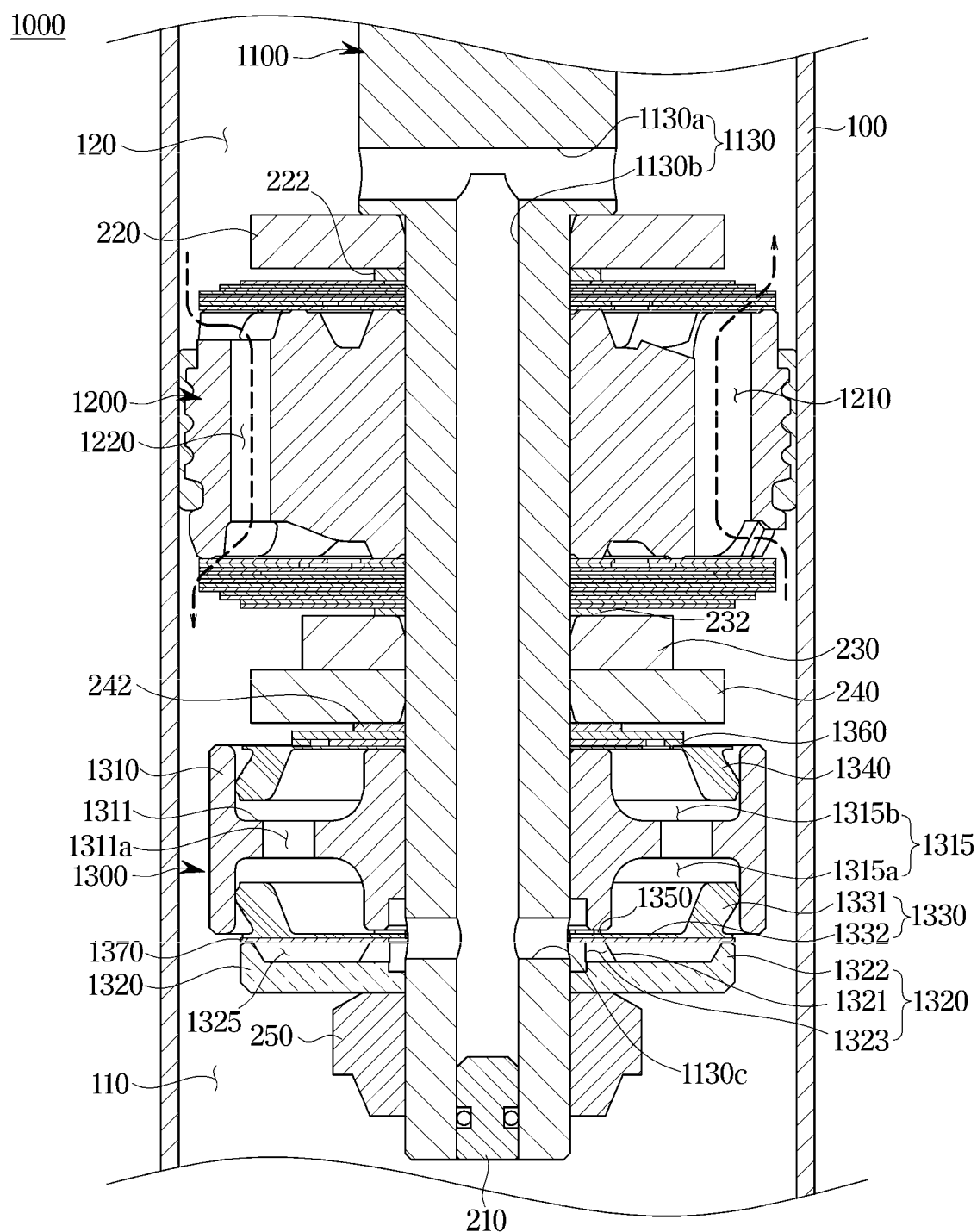

[FIG. 2]
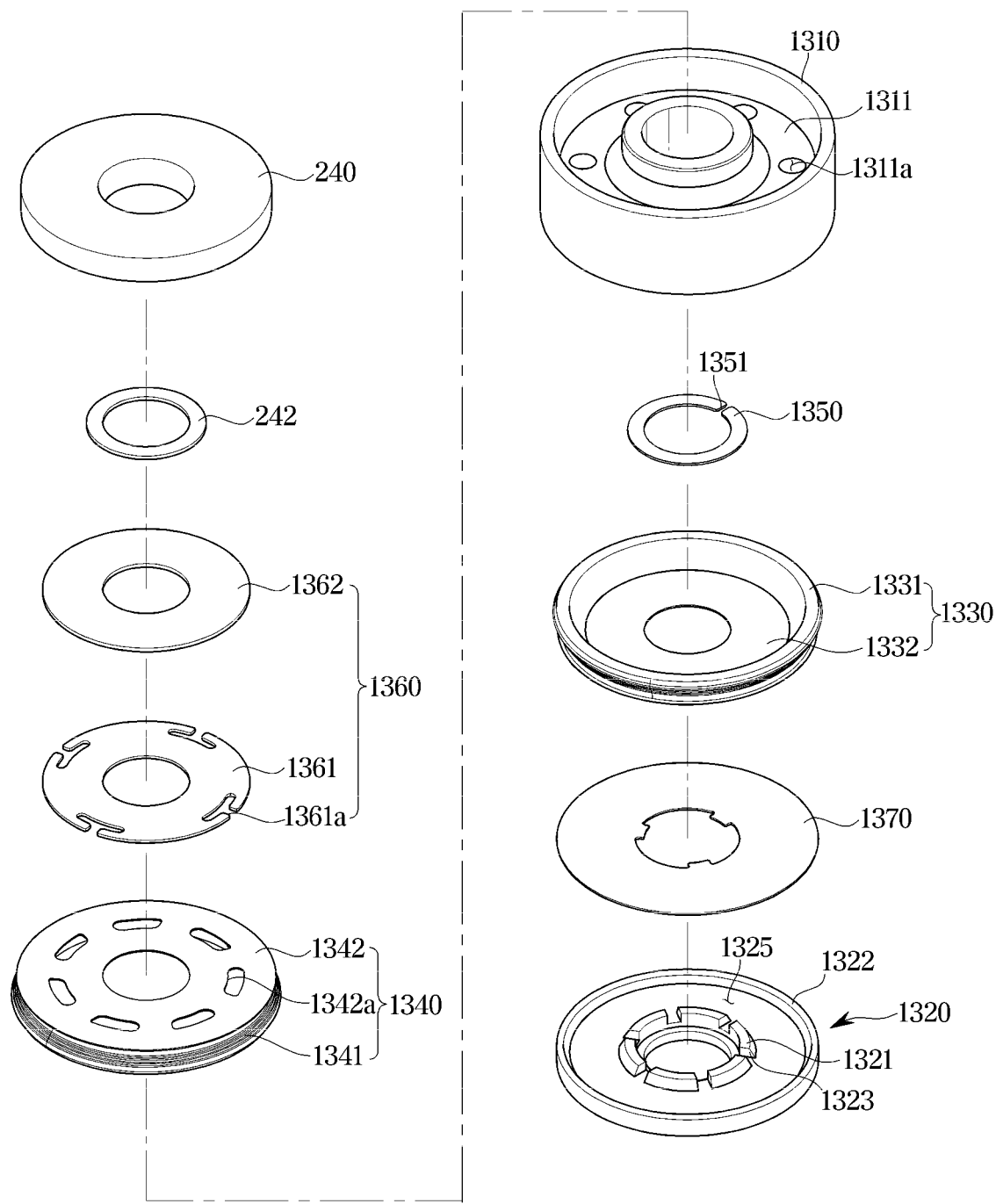

[FIG. 3]
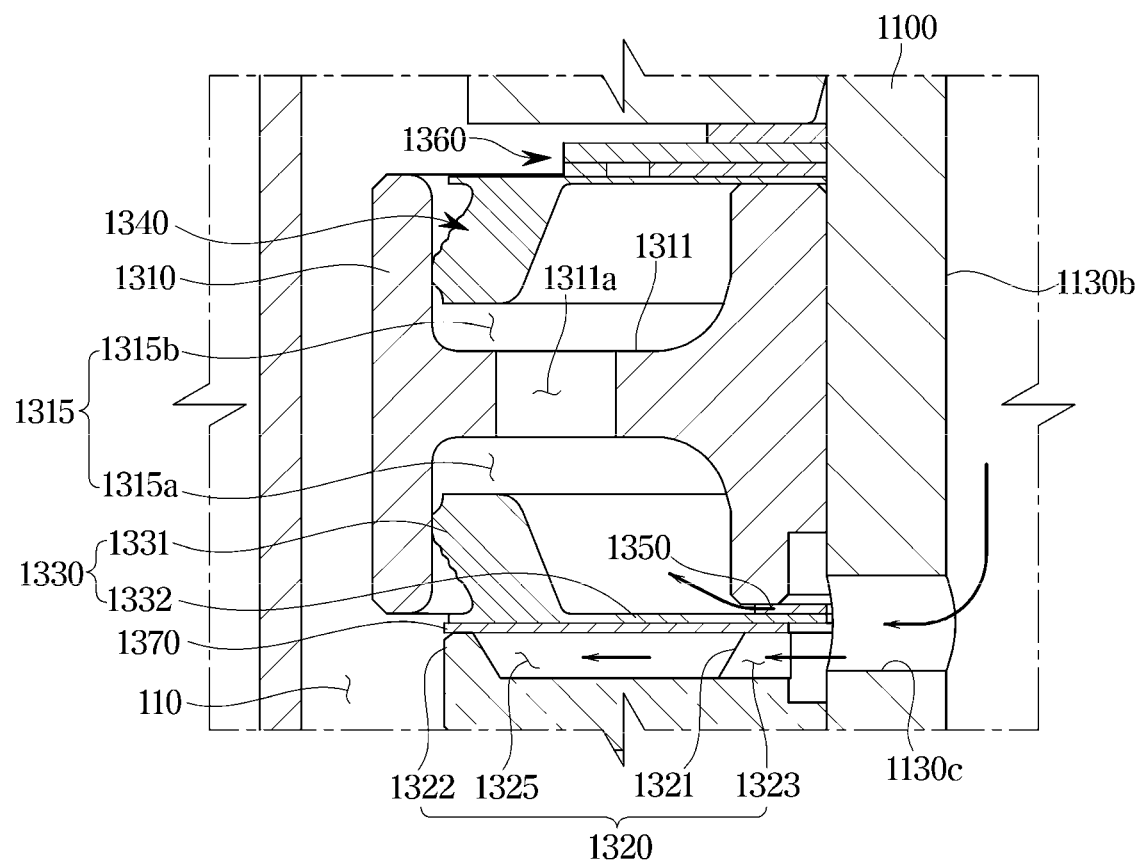

[FIG. 4]
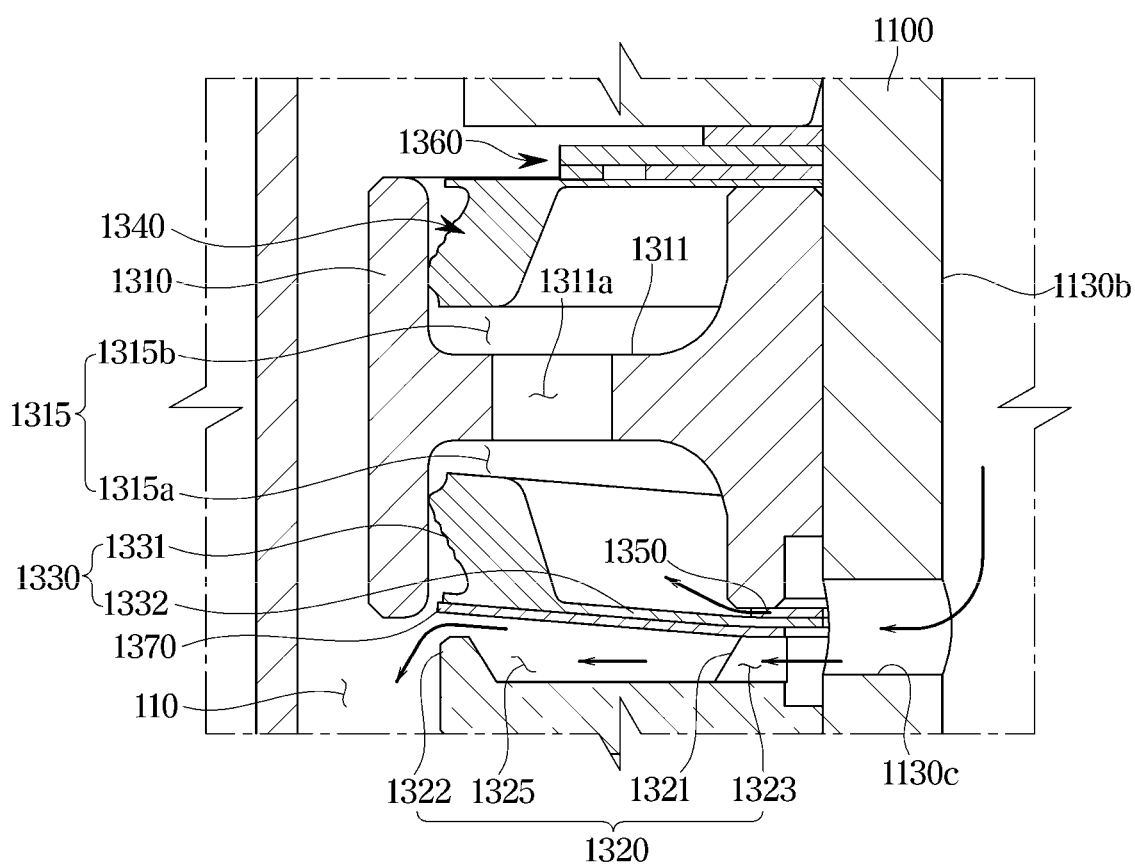

[FIG. 5]
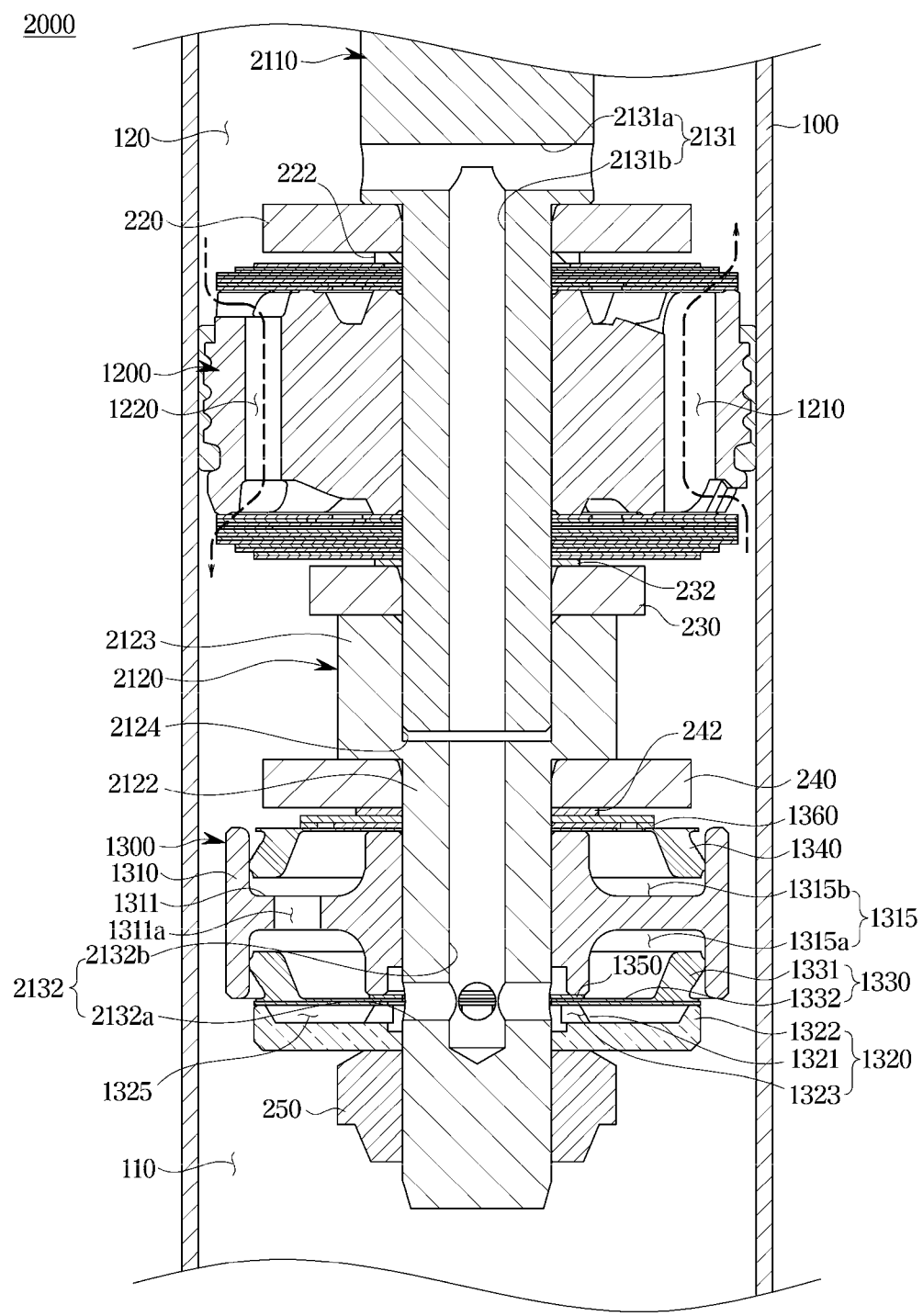
2100 : 2110, 2120

[FIG. 6]
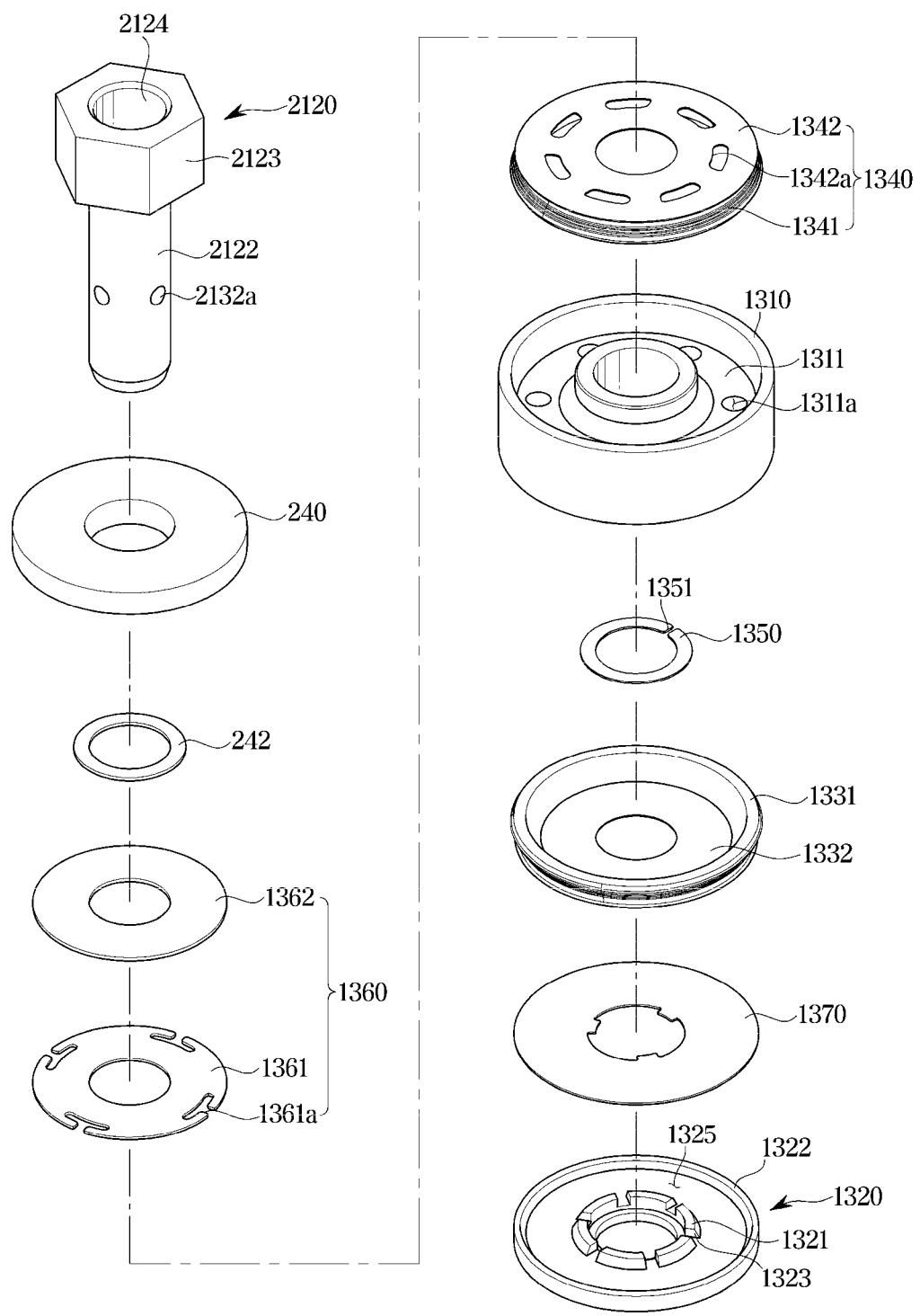

[FIG. 7]
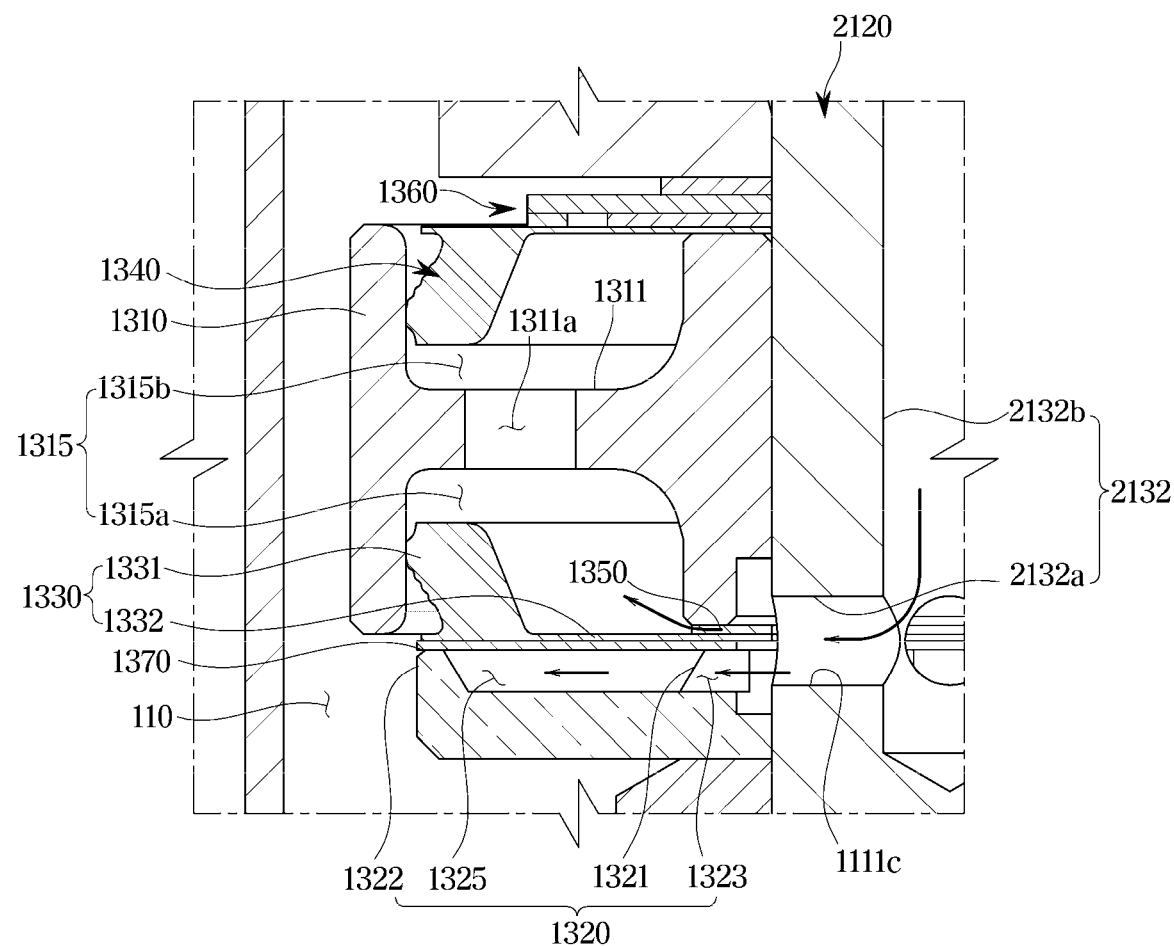

[FIG. 8]
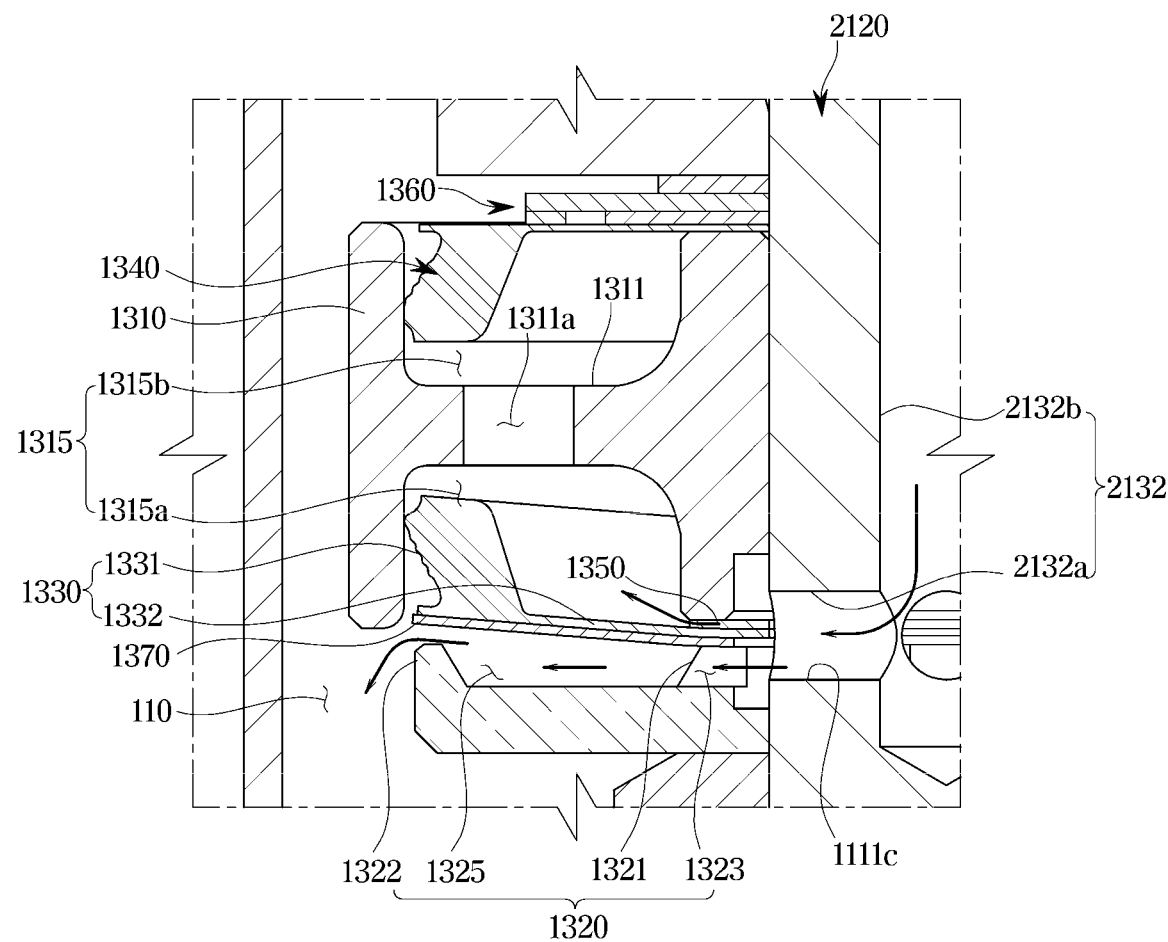

[FIG. 9]
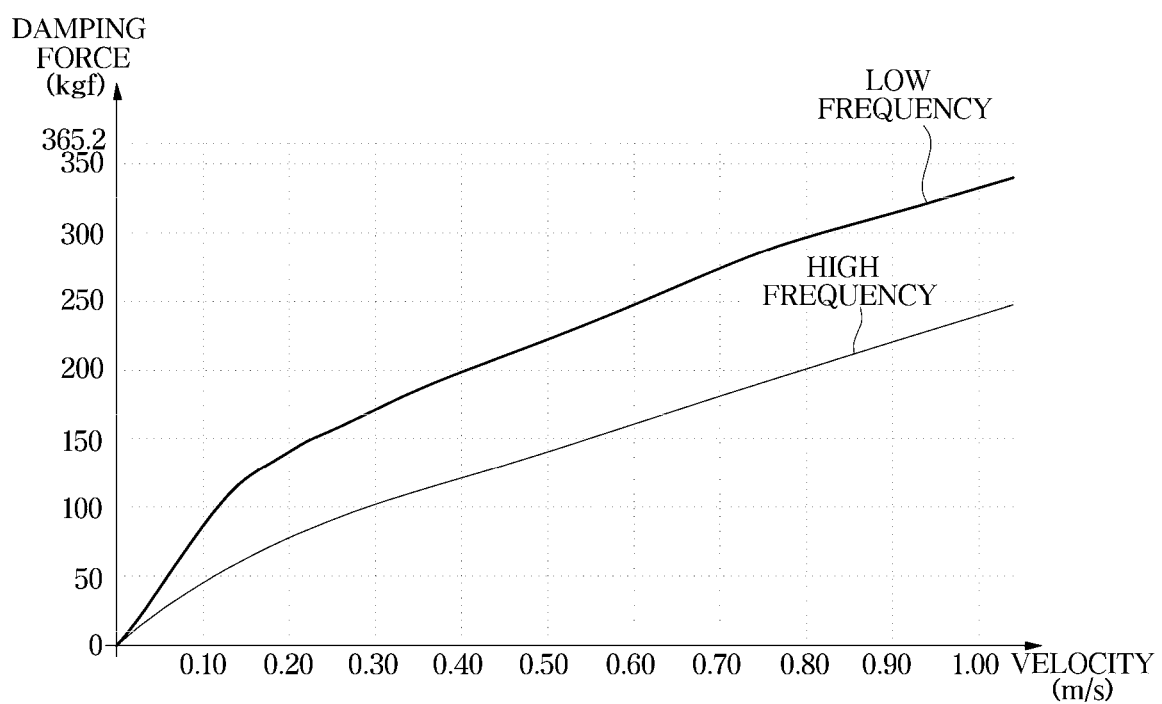

FREQUENCY SENSITIVE TYPE SHOCK ABSORBER

CROSS-REFERENCE TO RELATED APPLICATION(S)

This application is based on and claims priority under 35 U.S.C. § 119 to Korean Patent Application No. 10-2019-0069359, filed on Jun. 12, 2019, in the Korean Intellectual Property Office, the present disclosure of which is incorporated by reference herein in its entirety.

BACKGROUND

1. Field

The present disclosure relates to a frequency sensitive type shock absorber, and more specifically, to satisfy both ride comfort and adjustment stability by controlling damping force for high and low frequencies during compression and rebound strokes of a piston valve, respectively.

2. Description of Related Art

In general, a damping device is equipped with a vehicle to improve ride comfort by absorbing shock or vibration received from a road surface when driving, and a shock absorber is used as one of the damping devices.

The shock absorber is operated by the vibration of the vehicle depending on road surface condition. At this time, damping force generated in the shock absorber varies depending on operating speed of the shock absorber, that is, when the operating speed is fast or slow.

Adjusting damping force characteristics of the shock absorber is very important when designing the vehicle, because the ride comfort and the adjustment stability of the vehicle may be controlled according to how the damping force characteristics generated in the shock absorber are controlled.

Such shock absorbers are typically provided with a cylinder filled with working fluid (oil), a piston rod connected to a vehicle body to reciprocate, and a piston valve coupled to the bottom of the piston rod to slide inside the cylinder and control flow of the working fluid.

Since the piston valve is designed to have a constant damping characteristic at high speed, medium speed, and low speed using a single flow path, it may affect the medium and high speed damping force when attempting to improve the ride comfort by lowering the low speed damping force. In addition, conventional shock absorbers have a structure in which the damping force changes depending on a speed change of the piston regardless of frequency or stroke. As described above, since the damping force changed only depending on the speed change of the piston generates the same damping force in various road surface conditions, it is difficult to satisfy both the ride comfort and the adjustment stability.

Therefore, since the damping force may be varied according to various road surface conditions, that is, frequency and stroke, it is necessary to continuously research and develop a valve structure of the shock absorber that may satisfy both the ride comfort and the adjustment stability of the vehicle.

SUMMARY

It is one aspect of the present disclosure to provide a frequency sensitive type shock absorber capable of improving both ride comfort and adjustment stability of vehicle by installing a valve assembly together with a piston valve to generate a damping force that changes according to changes in frequency and speed.

It is another aspect of the present disclosure to provide the frequency sensitive type shock absorber capable of preventing performance of the adjustment stability from being deteriorated by preventing a decrease in the damping force during a rebound stroke in a low-frequency region.

It is another aspect of the present disclosure to provide the frequency sensitive type shock absorber capable of improving the ride comfort by decreasing the damping force during a rebound stroke in a high-frequency region.

It is another aspect of the present disclosure to provide the frequency sensitive type shock absorber capable of increasing assembly and productivity by integrally manufacturing a valve assembly and an auxiliary piston rod.

Additional aspects of the disclosure will be set forth in part in the description which follows and, in part, will be obvious from the description, or may be learned by practice of the disclosure.

In accordance with one aspect of the present disclosure, a frequency sensitive type shock absorber includes a piston rod reciprocating an inside of a cylinder and having a connection passage therein; a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke; wherein the valve assembly comprises a housing coupled to the piston rod and having a pilot chamber in communication with the connection passage; a main retainer coupled to the piston rod and having a main chamber formed on an upper portion thereof in communication with the connection passage; a first pilot valve coupled to the piston rod and disposed between the housing and the main retainer to partition the pilot chamber and the main chamber; and a second pilot valve coupled to the piston rod and disposed above the pilot chamber and configure to be elastically deformable depending on a change in pressure of the pilot chamber.

Further, the first pilot valve may be configured to be elastically deformable by pressure difference between the main chamber and the pilot chamber.

Further, the first pilot valve includes a body portion whose a bottom surface is in close contact with an upper portion of the main retainer; and a valve portion protruding along an outer edge portion of the body portion to be close contact with an inner surface of the housing, and elastically deformable depending on pressure difference due to an inflow amount of working fluid flowing into the main chamber.

Further, the main retainer includes a first seat portion protruding at regular intervals along an inner edge thereof; and a second seat portion protruding along an outer edge thereof.

Further, the main retainer may further include a main flow path formed between the first seat portions to be in communication with the connection passage.

Further, the frequency sensitive type shock absorber may further include an inlet disc interposed between the housing and the first pilot valve and having at least one slit communicating the connection passage and the pilot chamber.

Further, the frequency sensitive type shock absorber may further include a pilot disk coupled to the piston rod, and provided above the second pilot chamber to be elastically deformable.

Further, the pilot disc may include a disc-S configured to be in close contact with an upper portion of the second pilot valve to adjust flow rate of the working fluid flowing out of the pilot chamber; and an auxiliary disk configured to be in close contact with an upper portion of the disc-S to elastically support the disc-S and the second pilot valve.

Further, the second pilot valve radially may have at least one slot, and the disc-S may have at least one hole communicating with the slot at the outer edge thereof.

Further, the frequency sensitive type shock absorber may further include at least one disk interposed between the first pilot valve and the main retainer.

Further, the first pilot valve may be in contact with the upper portion of the main retainer during a low-frequency stroke, and may be spaced apart from the upper portion of the main retainer during a high-frequency stroke.

Further, the housing includes a partition wall partitioning the pilot chamber into a lower pilot chamber and an upper pilot chamber, and at least one communication hole penetrating vertically the partition wall.

Further, the piston rod includes a main piston rod on which the piston valve is mounted, the main piston provided on an upper side of the piston rod; and an auxiliary piston rod on which the valve assembly is mounted, the auxiliary piston coupled to a lower side of the piston rod.

Further, the connection passage includes a main connection passage formed inside the main piston rod; and an auxiliary connection passage formed inside the auxiliary piston rod to communicate the main connection passage and the valve assembly.

Further, the main retainer includes a first seat portion protruding at regular intervals along an inner edge thereof and a second seat portion protruding along an outer edge thereof.

Further, the main retainer may further include a main flow path formed between the first seat portions to be in communication with the auxiliary connection passage.

Further, the frequency sensitive type shock absorber may further include an inlet disc interposed between the housing and the first pilot valve and having at least one slit communicating the auxiliary connection passage and the pilot chamber.

Further, the housing includes a partition wall partitioning the pilot chamber into a lower pilot chamber and an upper pilot chamber, and at least one communication hole penetrating vertically the partition wall.

Further, the auxiliary piston rod includes a body portion extending downwardly to be mounted with the valve assembly; and a flange portion extending radially at an upper end portion of the body portion.

Further, the auxiliary piston rod may further include an insertion portion formed on the flange portion with a recessed shape, and having an inner circumferential surface corresponding to the outer circumferential surface of the main piston rod.

As is apparent from the above, the frequency sensitive type shock absorber according to the various embodiments of the present disclosure can satisfy both the ride comfort and the adjustment stability of the vehicle by installing the valve assembly together with the piston valve to generate the damping force that changes according to changes in frequency and speed.

In addition, the frequency sensitive type shock absorber according to the various embodiments of the present disclosure can prevent performance of the adjustment stability from being deteriorated by preventing the decrease in the damping force during the rebound stroke in the low-frequency region.

In addition, the frequency sensitive type shock absorber according to the various embodiments of the present disclosure can improve the ride comfort by decreasing the damping force during the rebound stroke in the high-frequency region.

In addition, the frequency sensitive type shock absorber according to the various embodiments of the present disclosure can increase assembly and productivity by integrally manufacturing the valve assembly and the auxiliary piston rod.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a cross-sectional view showing a frequency sensitive type shock absorber according to a first embodiment of the present disclosure;

FIG. 2 is an exploded perspective view showing a valve assembly provided in the frequency sensitive type shock absorber according to the first embodiment of the present disclosure;

FIG. 3 is a view showing operating state of the valve assembly during a low-frequency rebound stroke of the frequency sensitive type shock absorber according to the first embodiment of the present disclosure;

FIG. 4 is a view showing operating state of the valve assembly during a high-frequency rebound stroke of the frequency sensitive type shock absorber according to the first embodiment of the present disclosure;

FIG. 5 is a cross-sectional view showing a frequency sensitive type shock absorber according to a second embodiment of the present disclosure;

FIG. 6 is an exploded perspective view showing the frequency sensitive type shock absorber according to the second embodiment of the present disclosure;

FIG. 7 is a view showing operating state at a low-frequency rebound stroke of the frequency sensitive type shock absorber according to the second embodiment of the present disclosure;

FIG. 8 is a view showing operating state at a high-frequency rebound stroke of the frequency sensitive type shock absorber according to the second embodiment of the present disclosure; and FIG. 9 is a graph for explaining a change in damping force depending on speed change of the frequency sensitive type shock absorber according to the present disclosure.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numerals designate like elements throughout the specification.

FIG. 1 is a cross-sectional view showing a frequency sensitive type shock absorber according to a first embodiment of the present disclosure, and FIG. 2 is an exploded perspective view showing a valve assembly provided in the frequency sensitive type shock absorber according to the first embodiment of the present disclosure.

Referring to FIGS. 1 and 2, a frequency sensitive type shock absorber 1000 includes a piston rod 1100 reciprocating inside a cylinder 100, and a piston valve 1200 and a valve assembly 1300 which are mounted on the piston rod 1100.

The cylinder 100 may have a cylindrical shape forming a space therein, and working fluid (oil) is filled inside the cylinder 100. Herein, the interior of the cylinder 100 may be divided into a compression chamber 110 and a rebound chamber 120 by the piston valve 1200 to be described later.

The piston rod 1100 has one end located inside the cylinder 100 and the other end extending outside the cylinder 100 to be connected to a vehicle body side or a wheel side. The piston valve 1200 is mounted at one end of the piston rod 1100.

In addition, a connection passage 1130 is formed inside the piston rod 1100. The connection passage 1130 may be formed by being drilled such that a first flow path 1130a formed in a horizontal direction and a second flow path 1130b formed in a vertical direction cross each other. In addition, connection holes 1130c communicating with the second flow path 1130b and communicating with a pilot chamber 1315 and a main chamber 1325 to be described later may be formed in the piston rod 1100. Therefore, the working fluid in the rebound chamber 120 may be introduced into the piston rod 1100 through the connection passage 1130 during a rebound stroke of the piston rod 1100. The structure in which the working fluid flows into the pilot chamber 1315 and the main chamber 1325 through the connection holes 1130c will be described again below.

Meanwhile, a plug 210 is installed on a lower portion the second flow path 1130b of the connection passage 1130 to close the lower portion of the second flow path 1130b. As the lower portion of the second flow path 1130b is closed by the plug 210, the working fluid is prevented from flowing through the connection passage 1130 during a compression stroke of the piston rod 1100 and the working fluid in rebound chamber 120 does not allow to flow directly to the compression chamber 110 during the rebound stroke of the piston rod 1100. A sealing member may be installed between the plug 210 and the second flow path 1130b.

The piston valve 1200 is provided to reciprocally move the inside of the cylinder 100 filled with the working fluid together with the piston rod 1100 in a state which the piston rod 1100 is thoroughly coupled. A plurality of compression flow paths 1210 and rebound flow paths 1220 are formed to penetrate the piston valve 1200 up and down such that the working fluid moves during the compression and the rebound strokes.

Accordingly, the piston valve 1200 generates a damping force due to resistance force of the working fluid while reciprocating in compression and rebound stroke directions inside the cylinder 100.

For example, when the piston valve 1200 performs the compression stroke, pressure of the lower compression chamber 110 is increased compared to pressure of the upper rebound chamber 120. In this process, the working fluid filled in the compression chamber 110 by pressure rise of the compression chamber 110 moves to the rebound chamber 120 while pushing and opening valve means through the compression flow paths 1210 of the piston valve 1200.

On a contrary, when the piston valve 1200 performs the rebound stroke, the pressure of the rebound chamber 120 rises greater than the pressure of the compression chamber 110, and in this process, the working fluid in the rebound chamber 120 moves to the compression chamber 110 while pushing and opening the valve means through the rebound flow paths 1220 of the piston valve 1200.

The valve assembly 1300 is mounted on the piston rod 1100 to be disposed under the piston valve 1200. The valve assembly 1300 may serve to generate the damping force that changes with frequency during the rebound stroke. More specifically, the valve assembly 1300 includes a housing 1310 in which the pilot chamber 1315 is formed in a lower portion thereof, a main retainer 1320 in which the main chamber 1325 is formed in an upper portion thereof, a first pilot valve 1330 disposed between the housing 1310 and the main retainer 1320 to partition the pilot chamber 1315 and the main chamber 1325 and a second pilot valve 1340 disposed above the pilot chamber 1315 and provided to be elastically deformable depending on a change in pressure of the pilot chamber 1315.

The housing 1310 is coupled to the piston rod 1100, and the pilot chamber 1315 communicating with the connection passage 1130 is formed inside the housing 1310.

Particularly, the housing 1310 is provided in a ring-shape through which the piston rod 1100 penetrates centrally, and each of upper and lower surfaces of the housing 1310 is provided with hollows that may communicated with each other to form the pilot chamber 1315. At this time, the pilot chamber 1315 may be divided up and down by a partition wall 1311 to be formed of a lower pilot chamber 1315a and an upper pilot chamber 1315b, and may communicate with each other through a plurality of communication holes 1311a. The lower pilot chamber 1315a is formed between the housing 1310 and the first pilot chamber 1330 to communicate with the connection passage 1130, and the upper pilot chamber 1315b is formed between the housing 1310 and the second pilot valve 1340 to communicate with the lower pilot chamber 1315a through the plurality of the communication holes 1311a provided radially in the partition wall 1311.

The main retainer 1320 is coupled to the piston rod 1100. Also, the main retainer 1320 is disposed at a lower portion of the housing 1310 and an upper portion thereof is opened to form the main chamber 1325.

More specifically, the main retainer 1320 includes first seat portions 1321, in which the piston rod penetrates centrally and which protrude at regular intervals along an inner edge thereof, and a ring-shaped second seat portion 1322 stepped protruding from an outer edge of the main retainer 1320. In addition, upper surfaces of the first seat portions 1321 and the second seat portion 1322 are in contact with the first pilot valve 1330 positioned at an upper portion thereof.

Accordingly, the main chamber 1325 may be formed between the first seat portions 1321 and the second seat portion 1322, and the first pilot valve 1330. In addition, as the first seat portions 1321 are formed to protrude at regular intervals along the inner edge of the main retainer 1320 penetrated by the piston rod 1100, between the first seat portions 1321 spaced apart from each other, the connection passage 1130, that is, main flow paths 1323 connected to the connection holes 1130c is provided.

At this time, the main flow paths 1323 communicates with the connection holes 1130c and the main chamber 1325, and may be formed in a plurality of radial directions. Therefore, adjusting pressure of the working fluid flowing to the main chamber 1325 according to the cross-sectional area and number of the main flow paths 1323 may be controlled.

The first pilot valve 1330 is interposed between the housing 1310 and the main retainer 1320 so that the upper and lower portions thereof are in close contact with the housing 1310 and the main retainer 1320, respectively, thereby partitioning and forming the pilot chamber 1315 and the main chamber 1325.

In addition, the first pilot valve 1330 may be provided to be elastically deformable by pressure difference between the pilot chamber 1315 and the main chamber 1325.

More specifically, the first pilot valve 1330 includes a body portion 1332 in which a bottom surface thereof is in close contact with the upper portion of the main retainer 1320, and a valve portion 1331 that protrudes upward along an outer edge portion of the body portion 1332 and is in close contact with an inner surface of the housing 1310 to form the pilot chamber 1315. The body portion 1332 and the valve portion 1331 may be provided integrally, and may be made of a rubber material or a synthetic resin material to be elastically deformable. Therefore, the valve portion 1331 and/or the body portion 1332 may be elastically deformable depending on pressure difference due to an inflow amount of the working fluid flowing into the main chamber 1325 and the pilot chamber 1315. For example, the valve portion 1331 may be elastically deformed upward.

The first pilot valve 1330 described above is in contact with the upper portion of the main retainer 1320 during a low-frequency stroke. For example, due to pressure balance between the pilot chamber 1315 and the main chamber 1325 during the low-frequency stroke, the first pilot valve 1330 maintains contact with the upper portion of the main retainer 1320.

In addition, the first pilot valve 1330 may be formed to be spaced apart from the upper portion of the main retainer 1320 to open the main chamber 1325 as the pressure of the main chamber 1325 increases greater than the pressure of the pilot chamber 1315 during a high-frequency stroke.

The second pilot valve 1340 may be coupled to the piston rod 1100 and disposed on the upper portion of the pilot chamber 1315. In addition, the second pilot valve 1340 is elastically deformable depending on the change in pressure of the pilot chamber 1315.

More specifically, the second pilot valve 1340 includes a body portion 1342 in which a top surface thereof is in close contact with a lower portion of a pilot disk to be described later, and a valve portion 1341 that protrudes downward along an outer edge portion of the body portion 1342 and is in close contact with the inner surface of the housing 1310 to form the pilot chamber 1315. The body portion 1342 and the valve portion 1341 may be provided integrally, and may be made of a rubber material or a synthetic resin material to be elastically deformable.

In addition, a plurality of holes 1342a formed radially through the body portions 1342 is provided to allow the working fluid in the pilot chamber 1315 to pass through when pressure of the pilot chamber 1315 is sustainably increased, thereby preventing excessive pressure rise.

Furthermore, the valve portion 1341 and/or the body portion 1342 may be elastically deformable depending on the pressure due to the inflow amount of the working fluid flowing into the pilot chamber 1315. For example, the valve portion 1341 may be elastically deformed upward and downward.

The second pilot valve 1340 may expand a volume of the pilot chamber 1315 as the working fluid flows into the pilot chamber 1315 during the high-frequency stroke, thereby instantaneously generating pressure drop in the pilot chamber 1315. As a result, as the pressure difference with the main chamber 1325 increases, elastic deformation of the first pilot valve 1330 described above or opening of the main chamber 1325 may be further promoted.

Meanwhile, the valve assembly 1300 may further include an inlet disc 1350 and a pilot disc 1360.

The inlet disc 1350 is interposed between the housing 1310 and the first pilot valve 1330. The inlet disc 1350 is formed with at least one slit 1351 communicating the connection passage 1130, that is, the connection holes 1130c and the pilot chamber 1315 so that the working fluid flows into the pilot chamber 1315. For example, the inlet disc 1350 may be provided in a C shape as shown in FIG. 2, but is not limited thereto, and may be provided in various shapes if the slit 1351 capable of passing the working fluid is formed. In addition, by adjusting the cross-sectional area and number of the slits 1351, the inflow amount of the working fluid flowing into the pilot chamber 1315 may be controlled.

Herein, the connection holes 1130c are preferably located between the slit 1351 of the inlet disc 1350 and the main flow paths 1323 of the main retainer 1320 so that the working fluid may easily flow into the pilot chamber 1315 and the main chamber 1325. In addition, a cross-sectional area of the main flow paths 1323 communicating with the main chamber 1325 may be formed to be larger than that of the slit 1351 communicating with the pilot chamber 1315.

The pilot disc 1360 is coupled to the piston rod 1100 and disposed in close contact with an upper portion of the second pilot valve 1340. And, the pilot disk 1360 covers the upper portion of the second pilot valve 1340 to block the inflow of the working fluid from the upper portion of the second pilot valve 1340 into the pilot chamber 1315.

In addition, the pilot disk 1360 is elastically deformable to prevent sustained pressure rise of the pilot chamber 1315. For example, the pilot disk 1360 is elastically deformed so that the working fluid passes through depending on the pressure rise of the pilot chamber 1315 during the rebound stroke. The pilot disk 1360 may be provided in at least one disk type.

More specifically, the pilot disc 1360 may include a disc-S 1361 that is in close contact with the upper portion of the second pilot valve 1340 to adjust flow rate of the working fluid flowing out of the pilot chamber 1315, and an auxiliary disk 1362 that is elastically supported in close contact with the upper portion of the disc-S 1361. The disc-S 1361 is provided with holes 1361a formed through the position corresponding to holes 1342a of the second pilot valve 1340 described above. For example, the holes 1361a of the disc-S 1361 may be formed in a T-shape to be radially disposed at an outer end portion, and may be provided to communicate with the holes 1342a of the second pilot valve 1340. The auxiliary disk 1362 may be provided with a disk of the same radius as the disk-S 1361. In addition, the auxiliary disk 1362 adjusts flow of the working fluid passing through the holes 1361a of the disk-S 1361 described above and at the same time serves to support the disk-S 1361.

In addition, the valve assembly 1300 may further include at least one disk 1370 interposed between the first pilot valve 1330 and the main retainer 1320. The disk 1370 is installed to adjust elastic deformation coefficient of the first pilot valve 1330, and may be installed by increasing or decreasing the number of disk 1370 according to the needs of a designer and a driver. At this time, the disk 1370 is provided with an outer diameter equal to or larger than the outer diameter of the main retainer 1320, and an inner diameter of the disk 1370 may be provided to correspond to the outer diameter of the piston rod 1100. In addition, at least one slot that is bent inward may be provided at an inner end portion of the disc 1370.

As such, the frequency sensitive type shock absorber 1000 is reliably assembled by predetermined components so that the piston valve 1200 and the valve assembly 1300 move together with the piston rod 1100 and implement damping force generation performance. As shown in drawings, an upper washer 220 is mounted on the piston rod 1100 via a spacer 222 on the upper portion of the piston valve 1200, and lower washers 230 and 240 are mounted on the piston rod 1100 via a spacer 232 on the lower portion of the piston valve 1200. In addition, the valve assembly 1300 is mounted on the lower portion of the lower washer 240 via a spacer 242, and a nut 250 is fastened to the piston rod 1100 under the valve assembly 1300. Accordingly, the piston valve 1200 and the valve assembly 1300 which are mounted on the piston rod 1100 maintain a tightly coupled state in an axial direction of the piston rod 1100 and may be provided to move together with the piston rod 1100.

Hereinafter, an operating state in which the damping force is generated according to an operation of the frequency sensitive type shock absorber 1000 in accordance with the first embodiment of the present disclosure will be described.

First, as described above, the piston valve 1200 generates the damping force by allowing the working fluid in the compression chamber 110 and the rebound chamber 120 to move through the compression flow paths 1210 and the rebound flow paths 1220 formed in the piston valve 1200 during the compression and rebound strokes. At this time, since the valve assembly 1300 has little effect on the damping force during the compression stroke, an operation of the valve assembly 1300 during the rebound stroke will be described with reference to FIGS. 3 and 4.

FIG. 3 is a view showing the operation state of the valve assembly 1300 during a low-frequency rebound stroke of the frequency sensitive type shock absorber 1000 according to the first embodiment of the present disclosure, FIG. 4 is a view showing the operation state of the valve assembly 1300 during a high-frequency rebound stroke of the frequency sensitive type shock absorber 1000 according to the first embodiment of the present disclosure.

Referring to FIG. 3, in the low-frequency rebound stroke, the working fluid flows into the pilot chamber 1315 and the main chamber 1325 through the connection passage 1130 of the piston rod 1100. That is, the working fluid flows into the pilot chamber 1315 through the slit 1351 of the inlet disc 1350 and at the same time flows into the main chamber 1325 through the main flow paths 1323 of the main retainer 1320. At this time, as the piston rod 1100 operates at the low-frequency, the working fluid may be smoothly flowed into the pilot chamber 1315 through the slit 1351 of the inlet disc 1350. Accordingly, the pressure of the working fluid flowed into the pilot chamber 1315 and the main chamber 1325 is balanced, so that the first pilot valve 1330 maintains contact with the upper portion of the main retainer 1320 and the lower portion of the housing 1310.

Referring to FIG. 4, in the high-frequency rebound stroke, the working fluid flows into the pilot chamber 1315 and the main chamber 1325 through the connection passage 1130 of the piston rod 1100. At this time, due to inflow resistance generated while the working fluid passes through the narrow cross-sectional area of the slit 1351 of the inlet disk 1350, the inflow amount into the pilot chamber 1315 is less, thereby limiting the pressure rise. In addition, as the working fluid flows into the pilot chamber 1315, the second pilot valve 1340 is elastically deformed and the volume of the pilot chamber 1315 is enlarged, so that the pressure of the pilot chamber 1315 may be lowered. Accordingly, the pilot valve 1330 is elastically deformed and spaced apart from the upper portion of the main retainer 1320 depending on the pressure difference (the pressure in the main chamber is greater than the pressure in the pilot chamber) due to the inflow amount of the working fluid flowing into the main chamber 1325, thereby opening the main chamber 1325.

That is, the working fluid flowing into the main chamber 1325 during the high-frequency rebound stroke flows into the compression chamber 110 while the first pilot valve 1330 is opened toward the pilot chamber 1315, and ultimately, the damping force decreases compared to the low-frequency rebound stroke.

Hereinafter, a frequency sensitive type shock absorber 2000 according to a second embodiment of the present disclosure will be described.

In addition, the frequency sensitive type shock absorber 2000 according to the second embodiment of the present disclosure described below is the same as the frequency sensitive type shock absorber 1000 according to the first embodiment of the present disclosure described above, except for the additionally described by separate reference numerals among the description thereof. Accordingly, the description may be omitted to prevent duplication of the contents.

FIG. 5 is a cross-sectional view showing the frequency sensitive type shock absorber 2000 according to the second embodiment of the present disclosure, and FIG. 6 is the valve assembly 1300 of the frequency sensitive type shock absorber 2000 according to the second embodiment of the present disclosure.

Referring to FIGS. 5 and 6, the piston rod 2100 of the frequency sensitive type shock absorber 2000 according to the second embodiment of the present disclosure may include a main piston rod 2110 provided on an upper side thereof and mounted with the piston valve 1200, and an auxiliary piston rod 2120 coupled to a lower side of the main piston rod 2110 and mounted with the valve assembly 1300.

A connection passage 2131 is formed inside the piston rod 2100, and the connection passage 2130 may include a main connection passage 2131 formed inside the main piston rod 2110, and an auxiliary connection passage 2132 formed inside the auxiliary piston rod 2120 to communicate the main connection passage 2131 and the valve assembly 1300.

The main piston rod 2110 is provided on the upper side of the piston rod 2100, and one end thereof is located inside the cylinder 100 and mounted with the piston valve 1200 and the other end thereof is extended to the outside of the cylinder 100 and connected to the vehicle body side or the wheel side.

In addition, the main connection passage 2131 is formed inside the main piston rod 2110. The main connection passage 2131 may be formed by be drilled such that a first flow path 2131*a* formed in a horizontal direction and a second flow path 2131*b* formed in a vertical direction cross each other. In addition, the second flow path 2131*b* may communicate with connection holes 2132*a* through a third flow path 2132*b* of the auxiliary piston rod 2120, which will be described later, and may be connected to the pilot chamber 1315 and the main chamber 1325.

The auxiliary piston rod 2120 may be coupled to the lower side of the main piston rod 2110.

The auxiliary piston rod 2120 may include a body portion 2122 extending downwardly so that the valve assembly 1300 is coupled, and a flange portion 2123 extending in a radial direction on an upper side of the body portion 2122.

Specifically, the flange portion 2123 of the auxiliary piston rod 2120 may have a recessed insertion portion 2124 having an inner circumferential surface corresponding to an outer circumferential surface of the main piston rod 2110 at an upper end. Accordingly, a lower end of the main piston rod 2110 is fastened to the insertion portion 2124 to operate integrally with the auxiliary piston rod 2120.

The auxiliary piston rod 2120 has one end coupled with the main piston rod 2110, and the valve assembly 1300 is inserted into the other end.

The auxiliary connection passage 2132 is formed inside the auxiliary piston rod 2120. The auxiliary connection passage 2132 may include the third flow path 2132b formed in the vertical direction, and the connection holes 2132a communicating with the third flow path 2132b and communicating with the pilot chamber 1315 and the main chamber 1325. In addition, the third flow path 2132b is provided to be able to communicate with the second flow path 2131b of the main piston rod 2110 having one side communicated to the insertion portion 2124 side and fastened to the insertion portion 2124.

Therefore, during the rebound stroke, the working fluid in the rebound chamber 120 may be introduced into the piston rod 2100 through the main connection passage 2131, and flow into the pilot chamber 1315 and the main chamber 1325 through the auxiliary connection passage 2132.

Meanwhile, the auxiliary piston rod 2120 may be integrally produced with components such as the valve assembly 1300, the lower washer 240, and the nut 250, and may be coupled to the main piston rod 2110 after being integrally produced in one piece, thereby improving productivity and assembly.

In addition, since the auxiliary piston rod 2120 may be separately coupled, shape or position of the piston rod 2100 and the connection holes 2132a is easily changeable, so that it is easy to change the design of the entire component.

Hereinafter, an operation state in which the damping force is generated according to an operation of the frequency sensitive type shock absorber 2000 in accordance with the second embodiment of the present disclosure will be described.

FIG. 7 is a view showing the operation of the valve assembly 1300 during the low-frequency rebound stroke of the frequency sensitive type shock absorber 2000 according to the second embodiment of the present disclosure, and FIG. 8 is a view showing the operation of the valve assembly 1300 during the high-frequency rebound stroke of the frequency sensitive type shock absorber 2000 according to the second embodiment of the present disclosure.

Referring to FIG. 7, during the low-frequency rebound stroke, the working fluid accommodated in the rebound chamber 120 flows into the pilot chamber 1315 and the main chamber 1325 through the main connection passage 2131 and the auxiliary connection passage 2132. That is, the working fluid flows into the pilot chamber 1315 through the slit 1351 of the inlet disc 1350 and at the same time flows into the main chamber 1325 through the main flow paths 1323 of the main retainer 1320. At this time, as the piston rod 2100 operates at the low-frequency, the working fluid may be smoothly introduced into the pilot chamber 1315 through the slit 1351 of the inlet disc 1350. Accordingly, the pressure of the working fluid introduced into the pilot chamber 1315 and the main chamber 1325 is balanced, so that the first pilot valve 1330 maintains contact with the upper portion of the main retainer 1320 and the lower portion of the housing 1310.

Referring to FIG. 8, during the high-frequency rebound stroke, the working fluid accommodated in the rebound chamber 120 flows into the pilot chamber 1315 and the main chamber 1325 through the main connection passage 2131 and the auxiliary connection passage 2132. At this time, due to inflow resistance generated while the working fluid passes through the narrow cross-sectional area of the slit 1351 of the inlet disk 1350, the inflow amount into the pilot chamber 1315 is less, thereby limiting the pressure rise. In addition, as the working fluid flows into the pilot chamber 1315, the second pilot valve 1340 is elastically deformed and the volume of the pilot chamber 1315 is enlarged, so that the pressure of the pilot chamber 1315 may be lowered. Accordingly, the first pilot valve 1330 is elastically deformed and spaced apart from the upper portion of the main retainer 1320 depending on the pressure difference (the pressure in the main chamber 1325 is greater than the pressure in the pilot chamber 1315) due to the inflow amount of the working fluid flowing into the main chamber 1325, thereby opening the main chamber 1325.

That is, the working fluid flowing into the main chamber 1325 during the high-frequency rebound stroke flows into the compression chamber 110 while the first pilot valve 1330 is opened toward the pilot chamber 1315 side, and ultimately, the damping force decreases compared to the low-frequency rebound stroke.

Hereinafter, a change in the damping force according to speed change of the frequency sensitive type shock absorbers 1000 and 2000 of the present disclosure will be described by dividing them into the low-frequency and the high-frequency cases.

FIG. 9 is a graph for explaining the change in damping force according to speed change of the frequency sensitive type shock absorber in accordance with the present disclosure.

As shown in FIG. 9, in the frequency sensitive type shock absorbers 1000 and 2000 according to the present embodiment, by controlling the inflow amount of the working fluid flowed through the connection passages 1130 and 2130 into the pilot chamber 1315 and the main chamber 1325 during the rebound stroke, the damping force is decreased at the high-frequency in low-speed and medium-high-speed sections, so that the vehicle's ride comfort and adjustment stability may be satisfied simultaneously.

In addition, at the low-frequency, the adjustment stability may be prevented from being deteriorating by preventing the decrease in the damping force, and the ride comfort may be improved by generating the damping force only for high-frequency vibration caused by foreign matter on the road surface.

While the present disclosure has been particularly described with reference to exemplary embodiments, it should be understood by those of skilled in the art that various changes in form and details may be made without departing from the spirit and scope of the present disclosure.

What is claimed is:
1. A frequency sensitive type shock absorber comprising:
a piston rod reciprocating an inside of a cylinder and having a connection passage therein;
a piston valve mounted on the piston rod and having a plurality of compression and rebound flow paths penetrating up and down thereof, and partitioning the cylinder into compression and rebound chambers; and
a valve assembly mounted on the piston rod to generate a damping force that changes with frequency during a rebound stroke;

wherein the valve assembly comprises:
- a housing coupled to the piston rod and having a pilot chamber in communication with the connection passage;
- a main retainer coupled to the piston rod and having a main chamber formed on an upper portion thereof in communication with the connection passage;
- a first pilot valve coupled to the piston rod and disposed between the housing and the main retainer to partition the pilot chamber and the main chamber; and
- a second pilot valve coupled to the piston rod and disposed above the pilot chamber and configure to be elastically deformable depending on a change in pressure of the pilot chamber, and the frequency sensitive type shock absorber further comprises an inlet disc interposed between the housing and the first pilot valve and having at least one slit communicating the connection passage and the pilot chamber.

2. The frequency sensitive type shock absorber according to claim 1, wherein the first pilot valve is configured to be elastically deformable by pressure difference between the main chamber and the pilot chamber.

3. The frequency sensitive type shock absorber according to claim 1, wherein the first pilot valve comprises:
- a body portion having a bottom surface in contact with an upper portion of the main retainer; and
- a valve portion protruding along an outer edge portion of the body portion to be close contact with an inner surface of the housing, and elastically deformable depending on pressure difference due to an inflow amount of working fluid flowing into the main chamber.

4. The frequency sensitive type shock absorber according to claim 1, wherein an opening degree of the first pilot valve toward the pilot chamber during in a high-frequency rebound stroke is greater than an opening degree of the first pilot valve toward the pilot chamber during a low-frequency rebound stroke.

5. The frequency sensitive type shock absorber according to claim 1, further comprising at least one disk interposed between the first pilot valve and the main retainer.

6. The frequency sensitive type shock absorber according to claim 1, wherein the first pilot valve is in contact with the upper portion of the main retainer during a low-frequency stroke, and is spaced apart from the upper portion of the main retainer during a high-frequency stroke.

7. The frequency sensitive type shock absorber according to claim 1, wherein the housing comprises:
- a partition wall partitioning the pilot chamber into a lower pilot chamber and an upper pilot chamber, and
- at least one communication hole penetrating vertically the partition wall.

8. The frequency sensitive type shock absorber according to claim 1, wherein the piston rod comprises:
- a main piston rod on which the piston valve is mounted, the main piston provided on an upper side of the piston rod; and
- an auxiliary piston rod on which the valve assembly is mounted, the auxiliary piston coupled to a lower side of the piston rod.

9. The frequency sensitive type shock absorber according to claim 8, wherein the connection passage comprises:
- a main connection passage formed inside the main piston rod; and
- an auxiliary connection passage formed inside the auxiliary piston rod to communicate the main connection passage and the valve assembly.

10. The frequency sensitive type shock absorber according to claim 9, wherein the main retainer comprises:
- a first seat portion protruding at regular intervals along an inner edge thereof; and
- a second seat portion protruding along an outer edge thereof.

11. The frequency sensitive type shock absorber according to claim 10, wherein the main retainer further comprises a main flow path formed between the first seat portions to be in communication with the auxiliary connection passage.

12. The frequency sensitive type shock absorber according to claim 9, wherein the at least one slit of the inlet disc communicates the auxiliary connection passage of the connection passage and the pilot chamber.

13. The frequency sensitive type shock absorber according to claim 8, wherein the housing comprises:
- a partition wall partitioning the pilot chamber into a lower pilot chamber and an upper pilot chamber, and
- at least one communication hole penetrating vertically the partition wall.

14. The frequency sensitive type shock absorber according to claim 8, wherein the auxiliary piston rod comprises:
- a body portion extending downwardly to be mounted with the valve assembly; and
- a flange portion extending radially at an upper end portion of the body portion.

15. The frequency sensitive type shock absorber according to claim 14, wherein the auxiliary piston rod further comprises an insertion portion formed on the flange portion with a recessed shape, and having an inner circumferential surface corresponding to the outer circumferential surface of the main piston rod.

16. A frequency sensitive type shock absorber comprising:
- a piston rod reciprocating an inside of a cylinder and having a connection passage therein;
- a piston valve mounted on the piston rod and having a plurality of compression and rebound flow paths penetrating up and down thereof, and partitioning the cylinder into compression and rebound chambers; and
- a valve assembly mounted on the piston rod to generate a damping force that changes with frequency during a rebound stroke;

wherein the valve assembly comprises:
- a housing coupled to the piston rod and having a pilot chamber in communication with the connection passage;
- a main retainer coupled to the piston rod and having a main chamber formed on an upper portion thereof in communication with the connection passage;
- a first pilot valve coupled to the piston rod and disposed between the housing and the main retainer to partition the pilot chamber and the main chamber; and
- a second pilot valve coupled to the piston rod and disposed above the pilot chamber and configure to be elastically deformable depending on a change in pressure of the pilot chamber, wherein the main retainer comprises:
- a first seat portion protruding at regular intervals along an inner edge thereof; and
- a second seat portion protruding along an outer edge thereof.

17. The frequency sensitive type shock absorber according to claim 16, wherein the main retainer further comprises a main flow path formed between the first seat portions to be in communication with the connection passage.

18. A frequency sensitive type shock absorber comprising:
- a piston rod reciprocating an inside of a cylinder and having a connection passage therein;
- a piston valve mounted on the piston rod and having a plurality of compression and rebound flow paths penetrating up and down thereof, and partitioning the cylinder into compression and rebound chambers; and
- a valve assembly mounted on the piston rod to generate a damping force that changes with frequency during a rebound stroke;

wherein the valve assembly comprises:
- a housing coupled to the piston rod and having a pilot chamber in communication with the connection passage;
- a main retainer coupled to the piston rod and having a main chamber formed on an upper portion thereof in communication with the connection passage;
- a first pilot valve coupled to the piston rod and disposed between the housing and the main retainer to partition the pilot chamber and the main chamber; and
- a second pilot valve coupled to the piston rod and disposed above the pilot chamber and configure to be elastically deformable depending on a change in pressure of the pilot chamber, and wherein the frequency sensitive type shock absorber further comprises a pilot disk coupled to the piston rod, and provided above the second pilot valve to be elastically deformable.

19. The frequency sensitive type shock absorber according to claim 18, wherein the pilot disc includes:
- a disc-S configured to be in close contact with an upper portion of the second pilot valve to adjust flow rate of the working fluid flowing out of the pilot chamber; and
- an auxiliary disk configured to be in close contact with an upper portion of the disc-S to elastically support the disc-S and the second pilot valve.

20. The frequency sensitive type shock absorber according to claim 19, wherein the second pilot valve radially has at least one slot, and the disc-S has at least one hole communicating with the slot at the outer edge thereof.

* * * * *